(12) United States Patent
Cho et al.

(10) Patent No.: US 6,377,673 B1
(45) Date of Patent: Apr. 23, 2002

(54) INTELLIGENT PERIPHERAL SYSTEM AND CALL PROCESSING METHOD THEREOF

(75) Inventors: Min Su Cho; Tae Il Kim, both of Taejeon (KR)

(73) Assignees: Electronics and Telecommunications Research Institute, Daejon; Korea Telecom, Seoul, both of (KR)

( * ) Notice: Subject to any disclaimer, the term of this patent is extended or adjusted under 35 U.S.C. 154(b) by 0 days.

(21) Appl. No.: 09/206,033

(22) Filed: Dec. 4, 1998

(30) Foreign Application Priority Data

Oct. 9, 1998 (KR) .............................. 98-42260

(51) Int. Cl.$^7$ ................................. H04M 3/42
(52) U.S. Cl. .................. 379/201.01; 379/229; 370/220
(58) Field of Search ................. 379/201, 207, 379/229, 230, 114.29; 370/220

(56) References Cited

U.S. PATENT DOCUMENTS

| | | | |
|---|---|---|---|
| 5,237,693 A | * 8/1993 | Kiyohara et al. | 709/226 X |
| 5,377,186 A | * 12/1994 | Wegner et al. | 370/220 |
| 5,583,920 A | 12/1996 | Wheeler, Jr. | |
| 5,732,130 A | 3/1998 | Iapalucci et al. | |

OTHER PUBLICATIONS

*Call Control of Intelligent Peripheral based on Neural Networks*, Go Bong Choi, et al., ETRI, Korea, ISS'95, Apr. 1995, vol. 1, p. b7, pp. 288–292.

*IP–Based Interactive Voice Services In Advanced Intelligent Network*, Rha Soh, et al., ETRI, Proceedings of JTC–CSCC '94, B6–2–1, pp. 902–907.

* cited by examiner

*Primary Examiner*—Creighton Smith
(74) *Attorney, Agent, or Firm*—Cohen, Pontani, Lieberman & Pavane (57) ABSTRACT

An intelligent peripheral system and a call processing method thereof are disclosed. The system includes an apparatus storing and maintaining a special resource information for providing an intelligent network system to a user in accordance with a request of the user, and an apparatus performing a protocol matching function and a call processing function between a service switching point (SSP) and a service control point (SCP) of the advanced intelligent network system, wherein said both apparatuses are separately installed for thereby implementing a direct connection to another intelligent network system through a common line signal network and easily expanding a resource channel, for thereby directly being connected with another IP system and implementing an easier expandability of a resource channel by separately connecting an apparatus processing a protocol matching function between a user and an IP network and an apparatus processing a call processing function.

10 Claims, 10 Drawing Sheets

INTELLIGENT PERIPHERAL SYSTEM AND CALL PROCESSING METHOD THEREOF

BACKGROUND OF THE INVENTION

1. Field of the Invention

The present invention relates to an intelligent peripheral system and a call processing method thereof, and in particular to an improved IP(Intelligent Peripheral) system and a call processing method thereof which are capable of directly being connected with another IP system and implementing an easier expandability of a resource channel by separately connecting an apparatus processing a protocol matching function between a user and an IP network and an apparatus processing a call processing function.

2. Description of the Conventional Art

The IP(Intelligent Peripheral) system is directed to an independent intelligent network system which is capable of providing a user who requests an advanced intelligent network service through a SSP(Service Switching Point) with a special resource such as a guide broadcasting, a DTMF (Dual Tone Multi-Frequency) gathering, an audio recording, an audio mixing, an audio recognition, a FAX transmission/receiving function, etc. In particular, an IP(Intelligent Peripheral) system which is connected with another advanced intelligent network element through a NO. 7 signaling network in the IP system is called as a network IP(Network Intelligent Peripheral) system.

Figure 1:
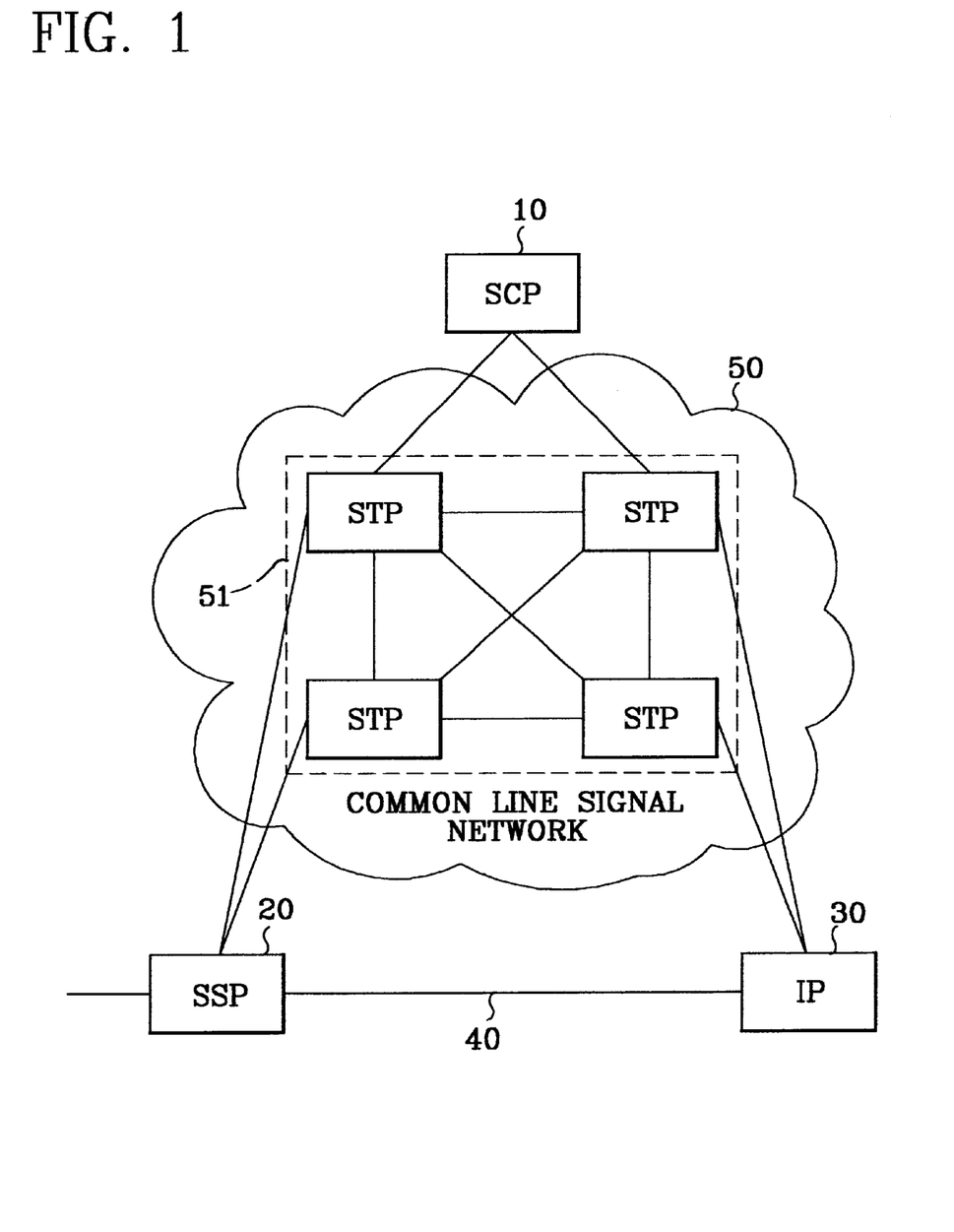
FIG. 1 is a view illustrating an advanced intelligent network according to the present invention.

FIG. 1 is a view illustrating an advanced intelligent network including the above-described IP. In the advanced intelligent network, a SCP(Service Control Point) 10, a SSP(Service Switching Point) 20 and an IP system 30 are connected with a common line signal network 50 through a plurality of STPs(Signaling Transfer Point) 51. At this time, the IP 30 connects a bearer channel 40 and a SSP 20 based on an E1 trunk and communicates a signal message with the SCP 10 and the SSP 20 through a signaling link 60 connected with the STP 51.

The IP 30 is formed of a resource sub-system which performs a call processing operation by allocating a resource to a bearer channel using an ISUP(ISDN user Part) and an INAP(Intelligent Network Application Protocol) which are connected in a common line signal network platform.

Figure 2:
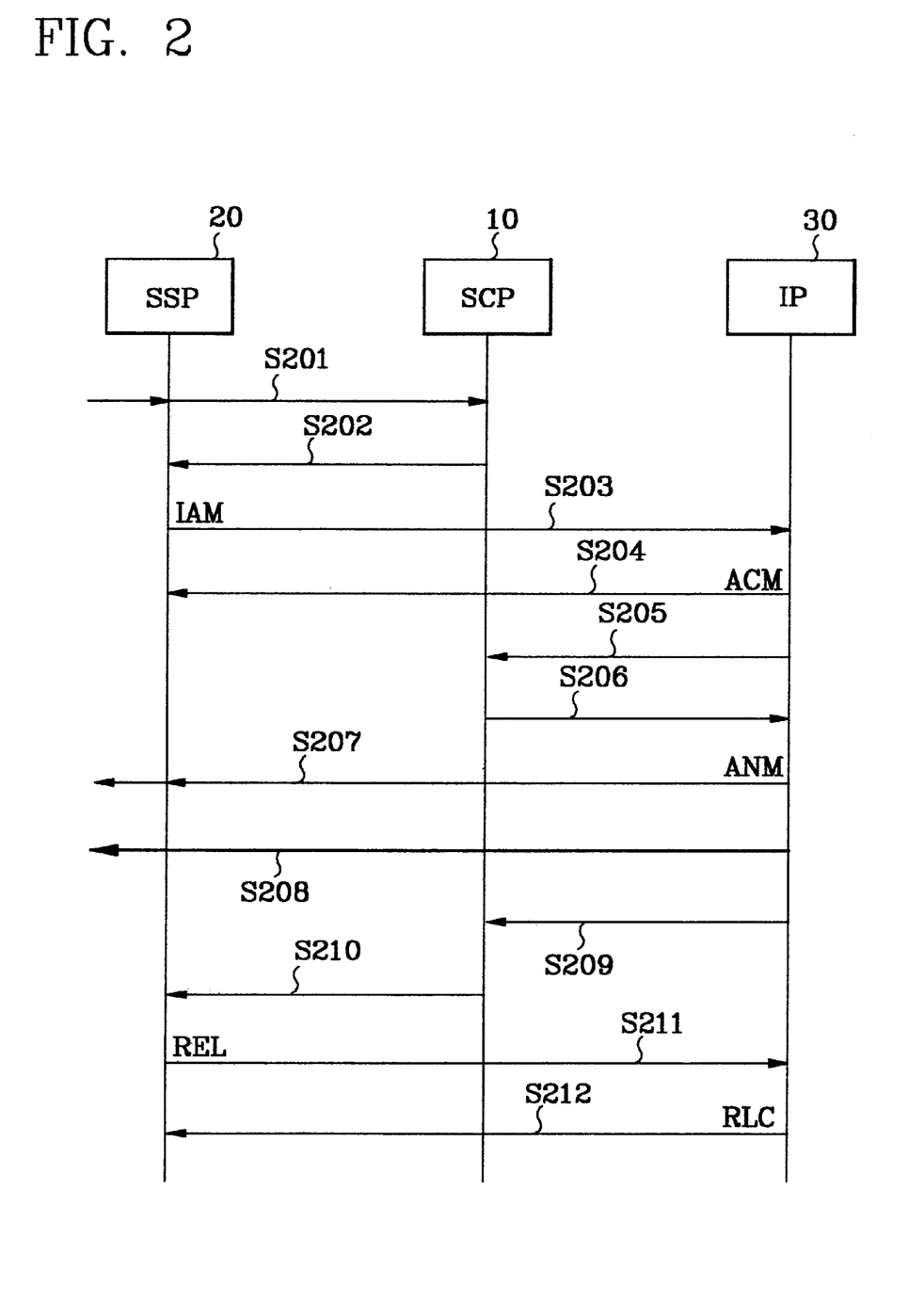
FIG. 2 is a view illustrating a procedure for providing a special resource of an IP(Intelligent Peripheral) system to a user according to the present invention.

FIG. 2 illustrates a procedure that an advanced intelligent network system provides a user with an intelligent network service. As shown therein, when a user transmits a request message for an intelligent network service in Step S201, the SCP 10 recognizes the intelligent network service request and allows the SSP 20 to connect the bearer channel with the IP 30 for providing a user with a special resource in accordance with a service logic in Step S202. The SSP 20 transmits an IAM(Initial Address Message) which set a called party address as an address of the IP 30 for connecting the bearer channel. At this time, the IAM is transferred through a signaling route of the common line signal network. The IP 30 which receives the IAM transmits an ACM(Address Complete Message) to the SSP 20 in accordance with an ISUP call processing procedure in Step 204 and requests a special resource to the SCP 10 for the user.

The SCP 10 received the request from the IP 30 drives the special resource in the IP 30 in accordance with the service logic, and the IP 30 transmits an AM(Answer Message) in accordance with an ISUP call processing procedure in Step S207 and drives the special resource for therein implementing an interface with the user based on the special resource in Step S208. In addition, a result of the special resource is informed to the SCP 10. At this time, the SCP 10 may continuously instructs a special resource driving and releases a bearer channel between the SSP 20 and the IP 30. If the bearer channel between the SSP 20 and the IP 30 is released, it is performed based on the ISUP call processing procedure.

Namely, when a channel release request signal is transmitted from the SCP 10 to the SSP 20 in Step S210, the SSP 20 received the signal transmits a REL(Release) message to the IP 30 for releasing the bearer channel, and the IP 30 transmits a RLC(Release Complete) message in Step S212.

When the IP is formed of an independent network, the call processing is performed based on the ISUP and INAP signal processing method. In the conventional exchange, the call is processed based on the R2 or ISUP signal method. An output repeater bearer channel is obtained by interpreting the called number of the input repeater bearer channel and IAM based on a number interpretation function of the exchange for thereby switching the bearer channel.

In the case of the conventional IP system formed of the resource sub-systems, if it is needed to expand the channel capacity of the special resource, the capacity of the resource sub-system should be expanded. In this case, since there is a limit in the capacity of the system for expanding the resource sub-system, other IP systems formed of the resource system should be added to the common line signal network. Therefore, the common line signal network platform is build for every IP system which is to be build for thereby increasing the fabrication cost of the system.

SUMMARY OF THE INVENTION

Accordingly, it is an object of the present invention to provide an intelligent peripheral system and a call processing method thereof which overcome the aforementioned problems encountered in the conventional art.

It is another object of the present invention to provide an intelligent peripheral system and a call processing method thereof which are capable of directly being connected with another IP system and implementing an easier expandability of a resource channel by separately connecting an apparatus processing a protocol matching function between a user and an IP network and an apparatus processing a call processing function.

In order to achieve the above objects, there is provided an intelligent peripheral system which includes an apparatus storing and maintaining a special resource information for providing an intelligent network system to a user in accordance with a request of the user, and an apparatus performing a protocol matching function and a call processing function between a service switching point(SSP) and a service control point(SCP) of the advanced intelligent network system, wherein said both apparatuses are separately installed for thereby implementing a direct connection to another intelligent network system through a common line signal network and easily expanding a resource channel.

In order to achieve the above objects, there is provided a call processing method of an intelligent peripheral system which includes the steps of a first step in which the SSP receives a request message for an intelligent network service from a user and transmits an initial address message(IAM) to the resource exchange sub-system for a bearer channel connection between the SSP and the IP providing system, a second step in which the resource exchange sub-system which received the IAM checks the capacity of the resource sub-system to provide a user with a special resource, a third step for transmitting an address receiving completed message(ACM) to the SSP and then requesting a special resource to the SCP when the resource sub-system is available as a result of the check of the second step, a fourth step for selecting an available special channel among the special resource channels connected between the resource exchange sub-system and the resource sub-system in accordance with a special resource requested, requesting a connection to the time switch of the resource exchange sub-system for connecting the selected special resource channel and the bearer channel and transmitting an answer message(ANM) to the SSP, a fifth step in which the resource exchange sub-system drives the special resource of the resource sub-system connected by the special channel for receiving a special resource from the resource sub-system and transmits a result of the special resource providing operation to the SCP, and a sixth step for maintaining a communication state so that a special resource is transmitted to the user through a special channel set between the resource sub-system and the resource exchange sub-system and a bearer channel set between the resource exchange sub-system and the service exchange.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly leveled out in the appended claims as a result of the experiment compared to the conventional arts.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The IP(Intelligent Peripheral) system and a call processing method thereof according to the present invention will now be explained with reference to the accompanying drawings.

Figure 3:
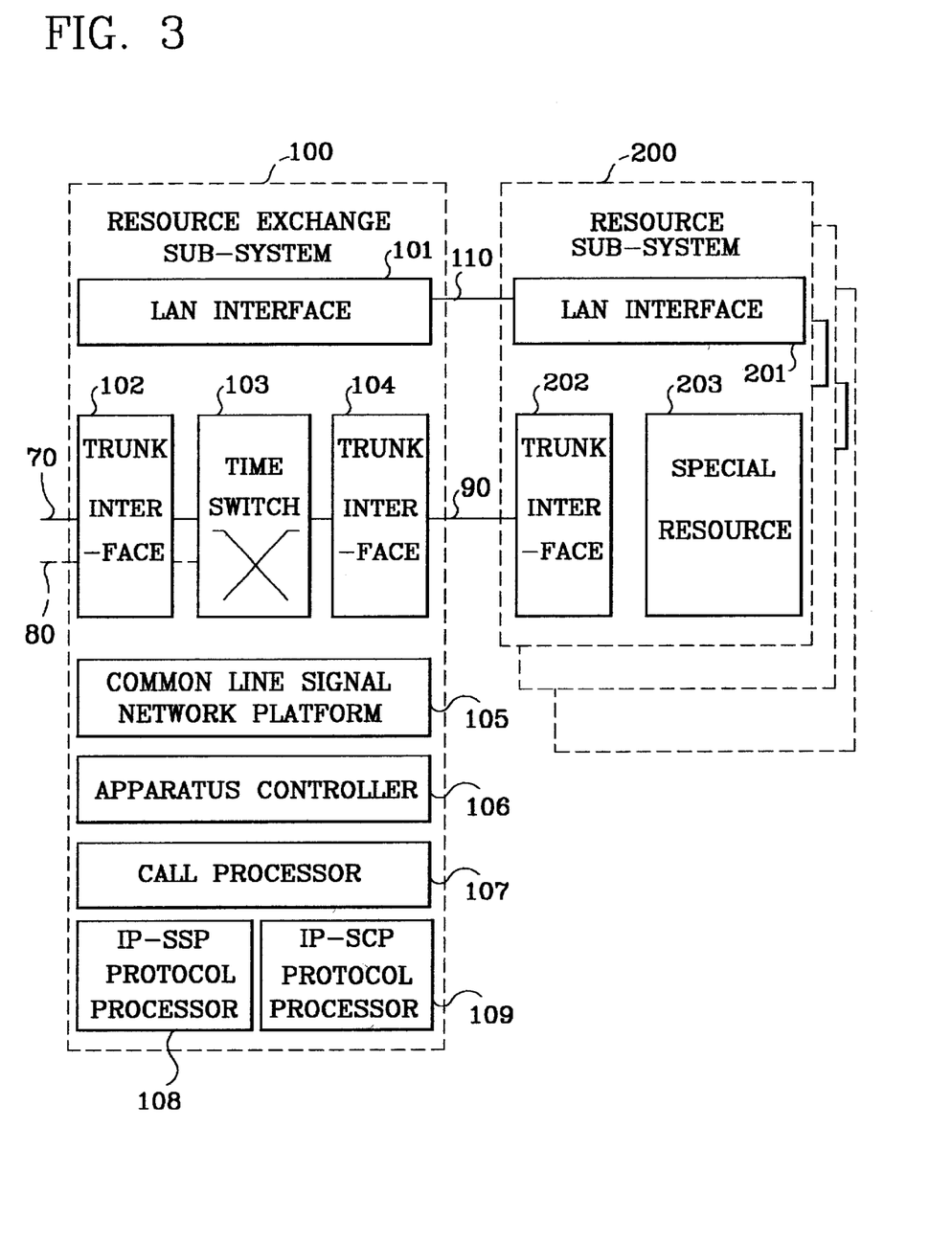
FIG. 3 is a block diagram illustrating a network IP system according to the present invention.

FIG. 3 illustrates a network IP system according to the present invention. As shown therein, the conventional IP system is formed of a resource sub-system. However, the network IP system according to the present invention includes a special resource information provided from an intelligent network system and is formed of a plurality of resource sub-systems 200 providing the special resource to a user, and a resource exchange sub-system 100 controlling a plurality of resource sub-systems 200 by connecting the IP system with a common line signal network, performing a protocol matching function between a service switching point (SSP) and a service control point(SCP), setting a bearer channel with respect to the SSP and setting a special resource channel with respect to the resource sub-system 200. The resource exchange sub-system 100 is connected with an external intelligent network system by the bearer channel 70 and the signal link 80 and is connected with the resource sub-system 200 by a special resource channel 90.

The resource sub-system 200 includes a LAN interface 201 forming the resource exchange sub-system 100 and a TCP/IP link 110, a trunk interface 202 for matching with the resource exchange sub-system 100, and a special resource 203 storing information for providing a user with the special resource service. The resource exchange sub-system 100 includes a common line signal network platform 105 for connecting the IP system with a common line signal network, two trunk interfaces 102 and 104 for matching the bearer channel 70 and the special resource channel 90, a time switch 103 for connecting the bearer channel 70 from the trunk interface 102 with the special resource channel 90, an apparatus controller 106 for controlling the trunk interfaces 102 and 104 and the time switch 103, a LAN interface 101 for driving a special resource 203 in the resource sub-system 200, protocol processors 108 and 109 for processing an IP-SSP protocol or an IP-SCP protocol which are the elements of the intelligent network system, and a call processor 107 for transmitting/receiving a signal message through the protocol processors 108 and 109 and controlling the apparatus controller 106 to recognizes the state of the related hardware and control the operation of the hardware.

The operation of the network IP system according to the present invention will be explained.

First, when a signal message is inputted through the signal link 80, the thusly inputted signal message is transferred to the common line signal network platform 105 through a channel defined in the trunk interface 102 and a time slot defined in the time switch 103, and the common line signal network platform 105 confirms that the thusly transferred message is outputted from which element, and inputs the same into the call processor 107 through the IP-SSP protocol processor 108 in the case of the message is inputted from the SSP and is inputted into the call processor 107 through the IP-SCP protocol processor 109 in the case that the message is inputted from the SCP.

Therefore, the network IP system according to the present invention is directed to a system structure which is capable of easily expanding the capacity of the bearer channel 70 and the special resource channel 90. In the case that the channel capacity of the system is expanded, the capacity of the time switch 103 is expanded, and then the resource sub-system 200 is added.

In addition, the above-described system requires an IP call processing function for switching through the bearer channel 70 and the special resource channel 90 using a parameter information an ISUP and IAP signal message. For this IP call processing function, the apparatuses of the system are controlled in accordance with a call processing logic in the call processor 107 of the resource exchange sub-system 100, and the special resource 203 of the resource sub-system 200 is driven.

FIGS. 4A through 4G illustrate a call processing procedure of the network IP system according to the present invention. The method for processing calls using the ISUP and INAP in the call processing unit 107 of the resource exchange sub-system when the network IP according to the present invention receives an IAM from the SSP will be explained.

Figure 4A:
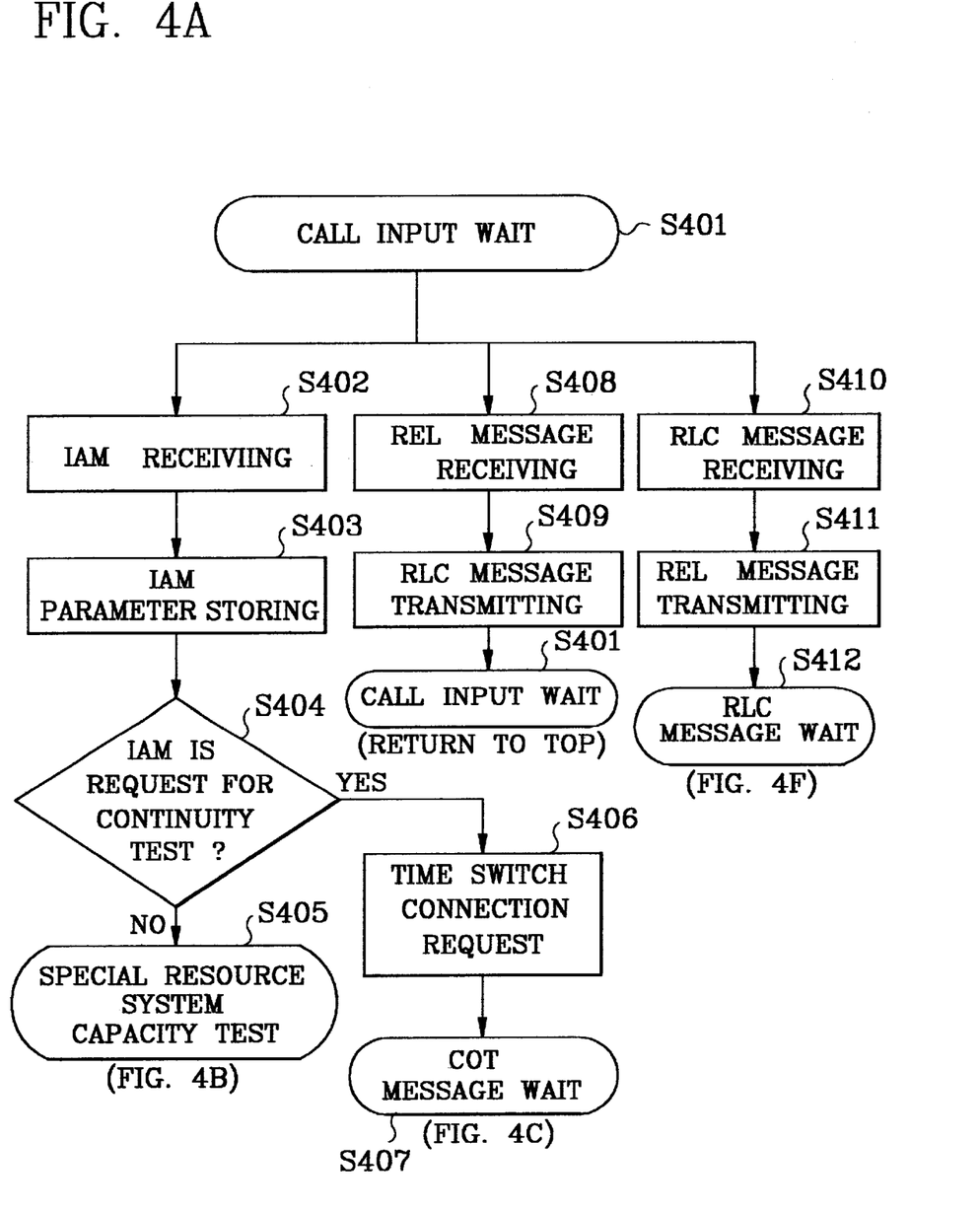
FIGS. 4A through 4G are views illustrating a call processing procedure for a network IP system according to the present invention.

As shown in FIG. 4A, when the network IP system receives an IAM from the IP-SSP protocol processing unit 108 in Step S402 while it is waiting for a signal message from a predetermined apparatus in Step S401, the call processor 107 stores a service control function identifier (SCF ID) contained in the IM and a correlation ID parameter into a call register in Step S403 and maintains the call information and then judges whether a continuity test request parameter contained in the IAM is set in Step S404.

As a result of the judgement of Step S404, if the continuity test request parameter is not set, the special resource system capacity test is performed in Step S405. If the continuity test request parameter is set, a receiving and transmitting terminals of the bearer channel 70 corresponding to a CIC(Circuit Identification code) of the IAM are connected for thereby verifying the state of the bearer channel in the SSP. Namely, the call processor 107 requests the apparatus controller 106 in order for the bearer channel to be connected with a loopback based on a time switch 103 for connecting the transmitting/receiving terminals of the bearer channel in Step S406, and waits for a COT (Continuity Test) from the SSP in step S407.

In addition, in the state of the call input wait (S401), if a REL(Release) message is inputted from the IP-SSP protocol processor 108 in Step S408, the connection is released, and a RLC(Release Complete) message is transmitted to the IP-SSP protocol processor 108, and the routine becomes a call input wait stare (S401). In addition, in the call input wait state (S401), a RLC(Release Complete) message is received from the IP-SSP protocol processor 108 in Step S410, the REL message is transmitted to the IF-SSP protocol processor 108 in Step S411, and waits until the RLC message is transmitted from the IP-SSP protocol processor 108 in Step S412.

Figure 4B:
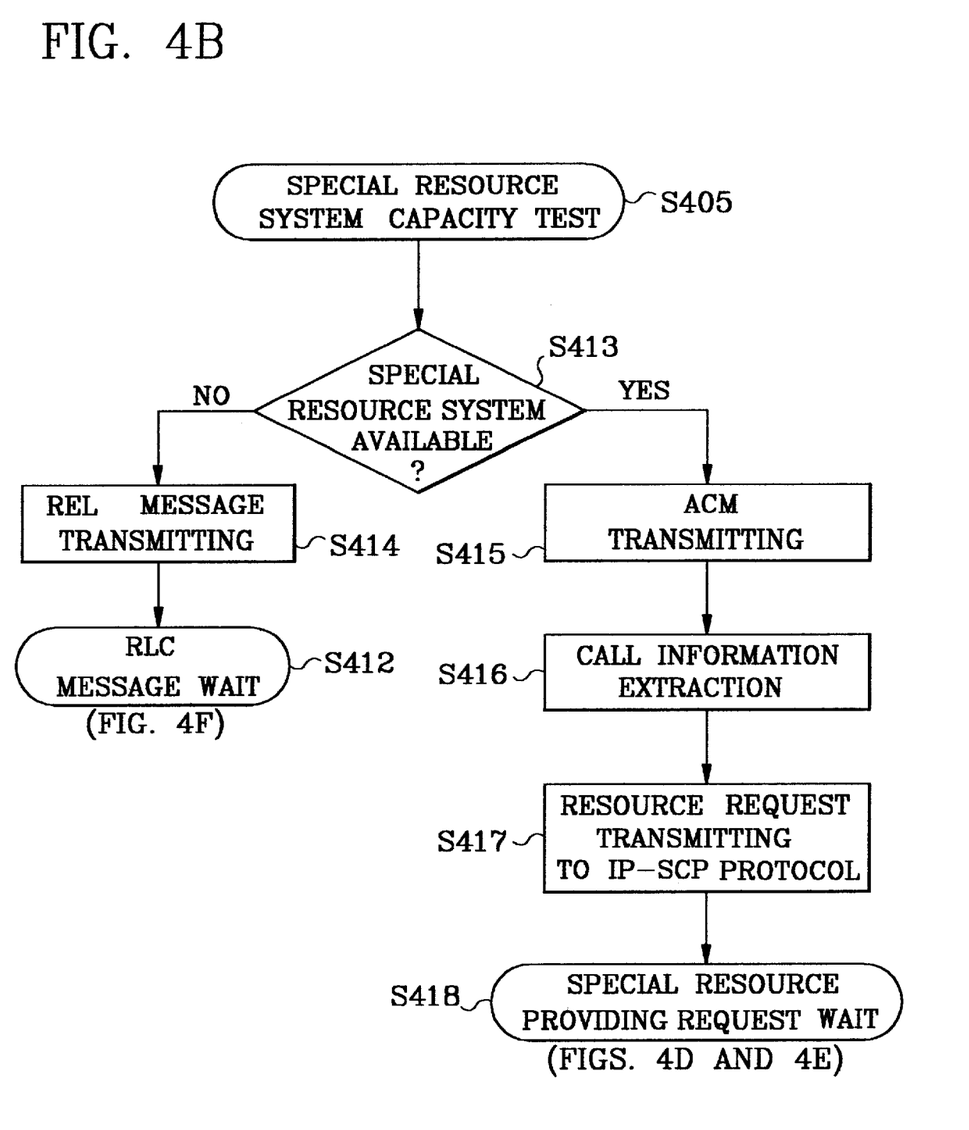

As shown in FIG. 4B, the special resource system capacity test (S405) is directed to a step for checking whether an overload occurs in the special resource system. In Step S413, it is checked whether or not the special resource system is available. If there is a variable resource system, the ACM is transmitted to the IP-SSP protocol processor 108 in Step 5415, and the SCF ID and the correlation number are extracted from the call register in Step S416. The SCF ID among the extracted information is a SCP signal point code, and the correlation number is a value that the SCP identifies the call. When the call information is extracted in such a manner, the resource request is transmitted for providing to the IP-SCP protocol processor 109 in Step S417. The SCF ID among the thusly extracted information is used as a destination point code by the IP-SSP protocol processor 108, and the correlation number is mapped based on the parameter of the resource request message and then is transferred to the SCP. In addition, after the above-described steps are proceeded, the special resource is requested in Step S418.

In addition, a result of the verification on whether the special resource system is available in Step S413, if there is not an available resource system, the REL message is transmitted to the IP-SSP protocol processor 108 in Step S414, and the RLC message is waited from the IP-SSP protocol processor 108 in Step S412.

Figure 4C:
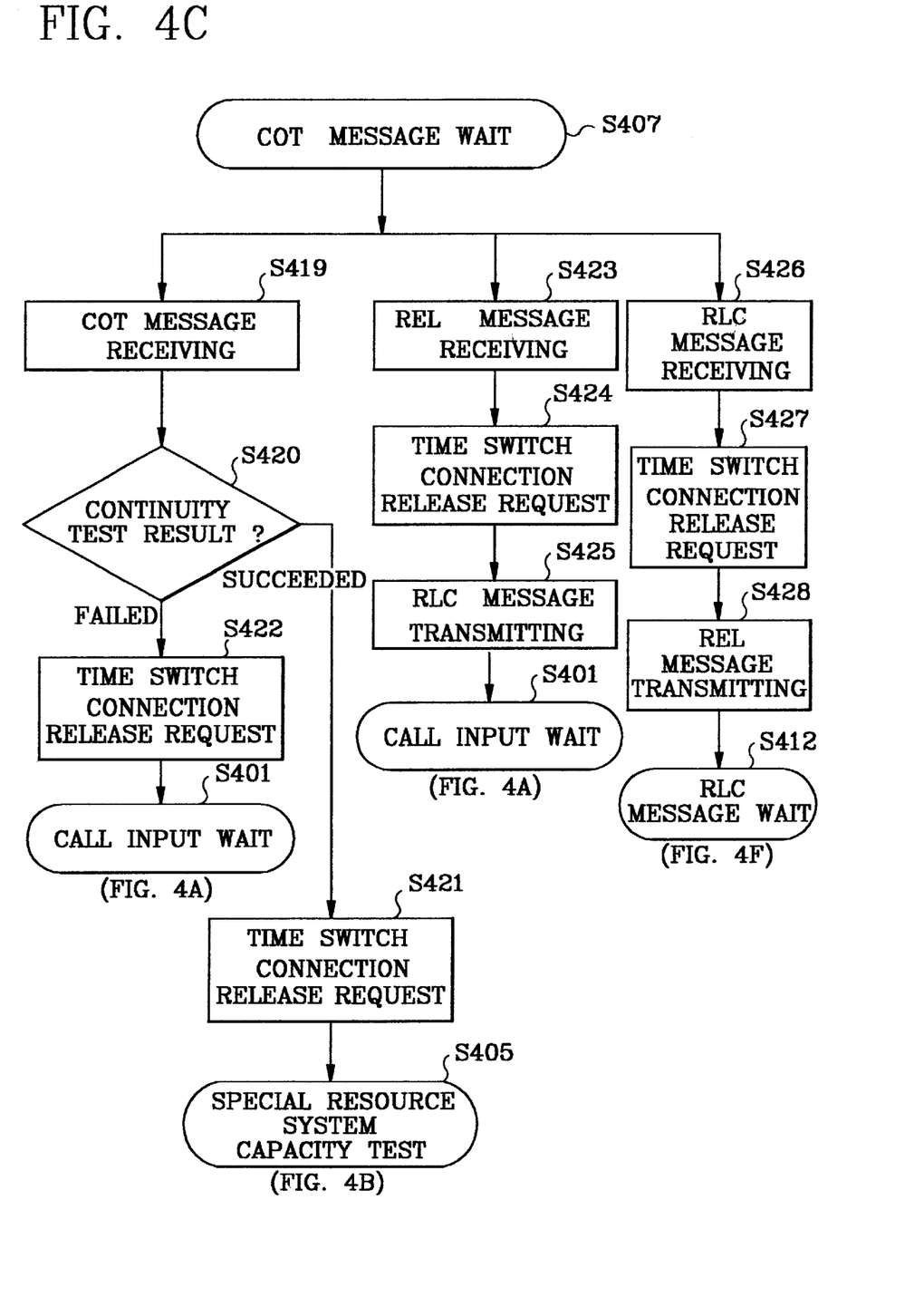

As shown in FIG. 4C, in the COT message waiting state (S407), a predetermined message is received from the IP-SSP protocol processor. If the thusly received message is the COT message in Step S4189, the test result parameter contained in the COT message is checked in Step S420. If the continuity is succeeded, the connection with respect to the time switch 103 of the loopback channel is released in Step S421 for a continuity test, and the capacity of the special resource system is tested in Step S405.

As a result of the test S420, if the continuity test is failed, the connection with respect to the time switch 103 of the loopback channel is released in Step S422, and the routine is moved to the call input wait state S401.

In addition, when the REL or RLC message is received from the IP-SSP protocol processor 108 in Steps S423 and S426, the time switch connection of the loopback channel is released in Step S424 and S427, and then the REL or RLC message is transmitted to the IP-SSP protocol processor 108 in Steps S425 and S428. At this time, if the received message is REL, the RLC message is transmitted, and if the received message is RLC, the REL message is transmitted.

If the RLC message is transmitted, the routine is moved to the call input wait state (S401) . If the REL message is transmitted, the RLC message from the IP-SSP protocol processor is waited in Step S412.

Figure 4D:
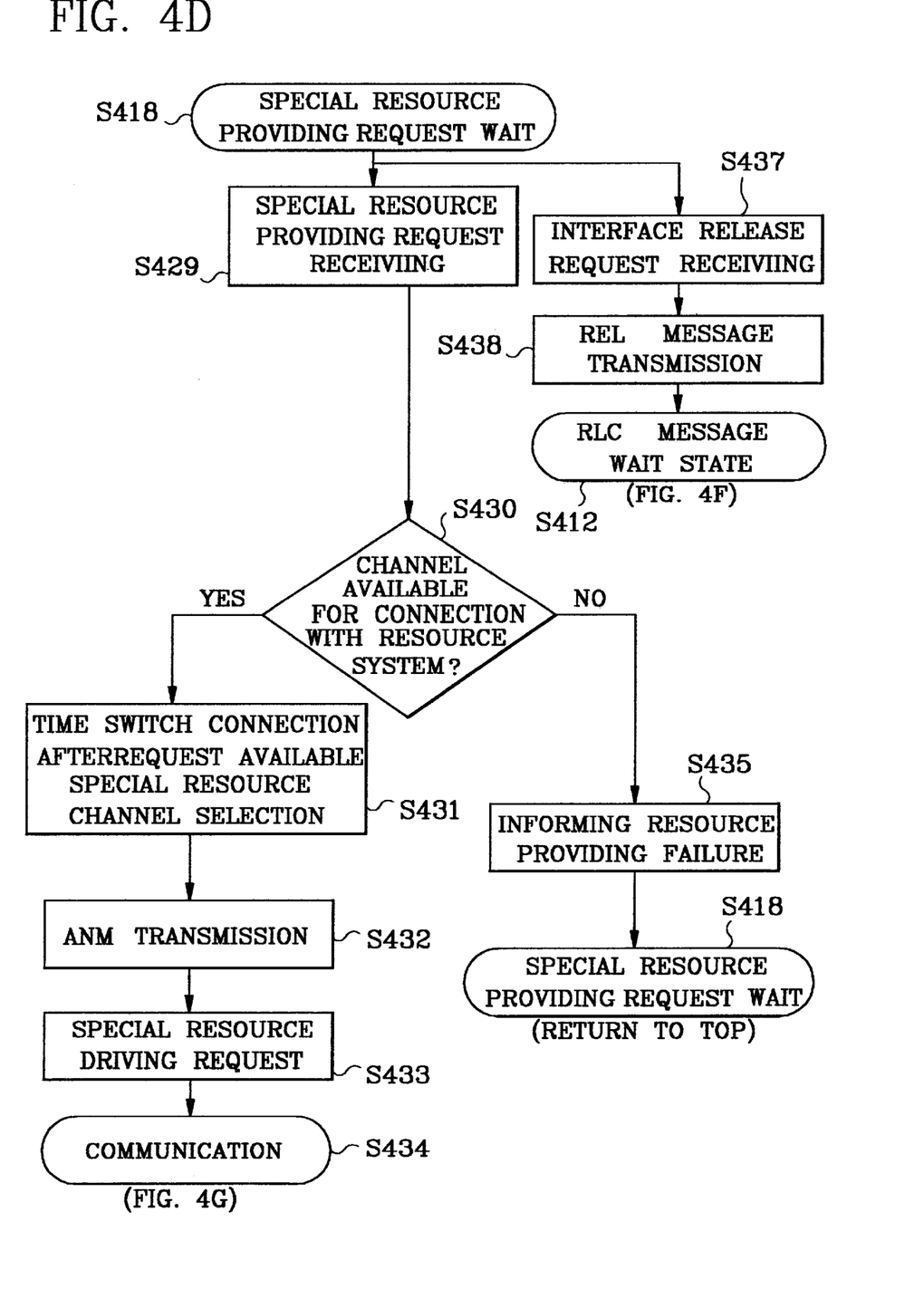

As shown in FIG. 4D, in the state of the special resource providing request wait (S418), when the special resource providing request message is received from the IP-SCP protocol processor 109 in Step S429, it is verified that whether the channel connected with the resource sub-system for storing the special resource is available in Step S430. As a result of the verification, if the channel connected with the resource sub-system is available, the time switch 103 is requested to be connected by instructing the apparatus controller 106 for connecting the available special resource channel and the bearer channel in Step S431, and the ANM is transmitted to the IP-SSP protocol processor 108.

When the time switch 103 is connected and then the ANM is transmitted in such a manner, the bearer channel becomes a connected state for transferring the special resource to the SSP and SP. When the bearer channel is connected in such a manner, the resource driving is requested to the sub-system 200 through the LAN interface 101 in Step S433, so that a corresponding special resource is transferred to the user. Namely, the call-on state is implemented in Step S434.

However, as a result of the verification of Step S430, if there is not an available special resource channel connected with the resource system, the resource providing fail message is transmitted to the IP-SCP protocol processor 109 in Step S435, and the special resource providing request wait state (S418) is maintained.

In addition, in the special resource providing request wait state (S418), when the IP-SCP interface release request message is received from the IP-SCP protocol processor 109 in Step S436, the REL message is transmitted to the IP-SSP protocol processor 108 in Step S437, and the routine is changed to the routine that the RLC from the IP-SSP protocol processor 108 is waited in Step S412.

Figure 4E:
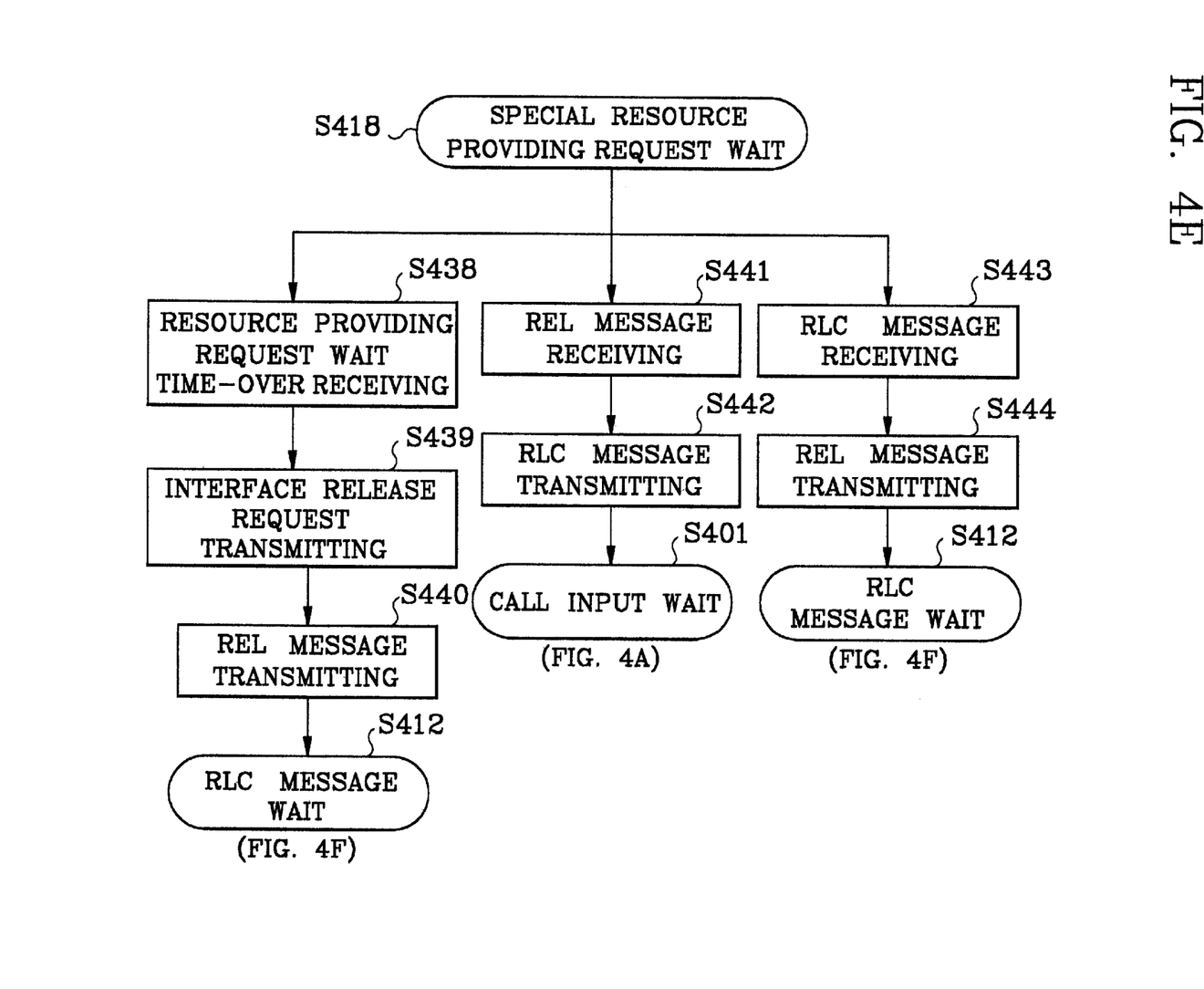

As shown in FIG. 4E, if the special resource request message is not received for a predetermined time in the special resource providing request wait state (S418) in Step S438, an interface release request message is transmitted to the IP-SCP protocol processor 109 in Step S439, and the REL message is transmitted to the IP-SSP protocol processor 108 in Step S440, and the RLC from the IP-SSP protocol is waited in Step S412.

In addition, when the REL message is received from the IP-SSP protocol processor 108 in Step S441 during the waiting of the special resource providing request from the call processor 107, the RLC is transmitted to the IP-SSP protocol processor 108 in Step S442, and the input of the signal message is waited in Step S401. In addition, in the wait state in Step S418, when the RLC message is received from the IP-SSP protocol processor 108, the REL message is transmitted to the IP-SSP protocol processor 108 in Step S444, and the RLC message from the IP-SSP protocol processor 108 is waited in Step S412.

Figure 4F:
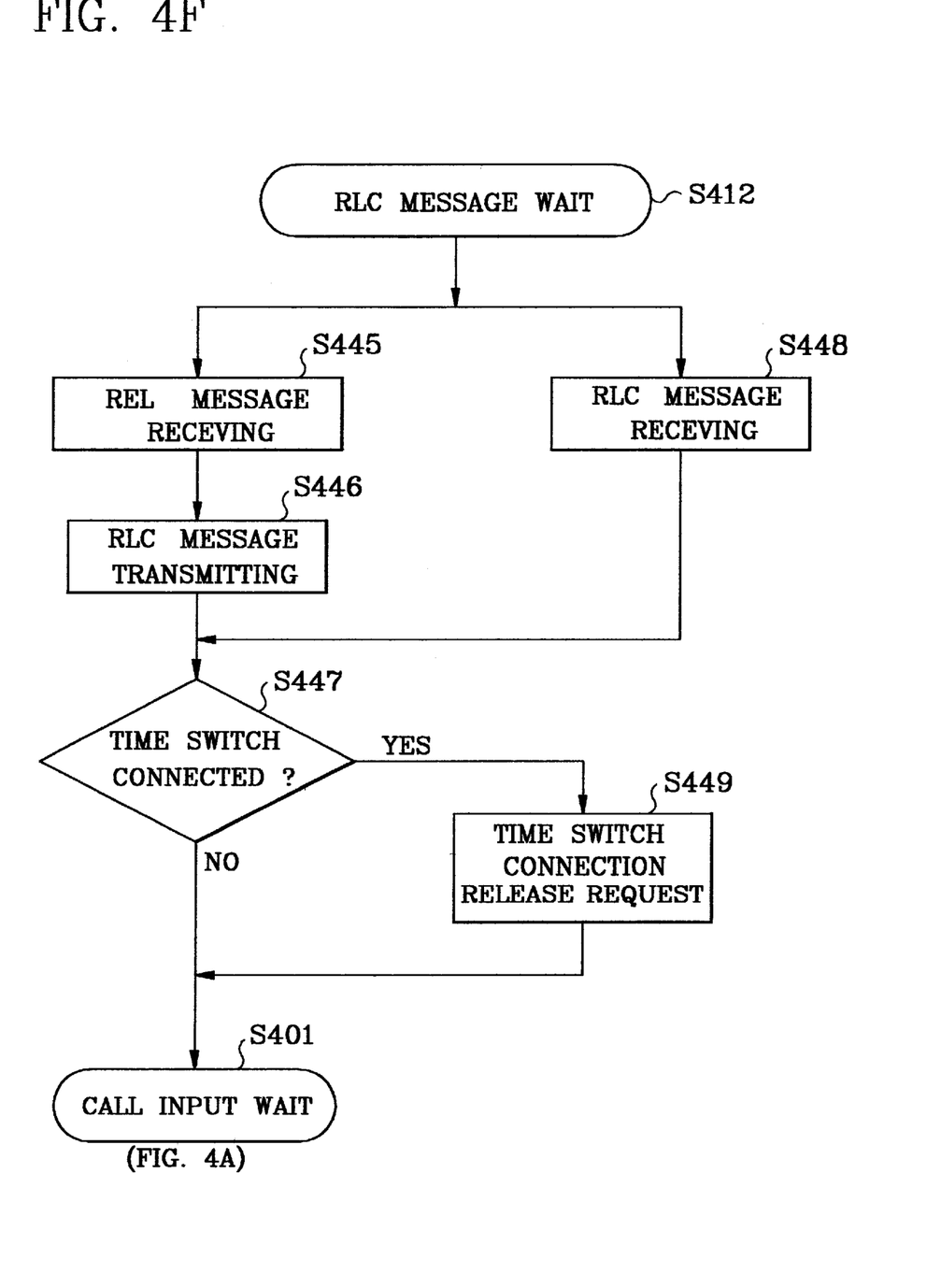

As shown in FIG. 4F, while the call processor 107 is waiting the RLC message from the IP-SSP protocol processor in Step S412, when the REL message is received from the IP-SSP protocol processor 108 in Step S445, the RLC is transmitted to the IP-SSP protocol processor 108 in Step S446, and it is judged that whether the time switch 103 is connected in Step S447. As a result of the judgement, if the RLC message is received from the IP-SSP protocol processor in Step S448, it is judged that whether the time switch 103 is connected in Step S447.

In addition, as a result of the judgement in Step S447, if the time switch 103 is connected, the connection is released in Step S449, and the routine is transited to the call input wait state in Step S401. In addition, if the time switch 103 is not connected, the routine is transited to the call input wait state in Step S401.

Figure 4G:
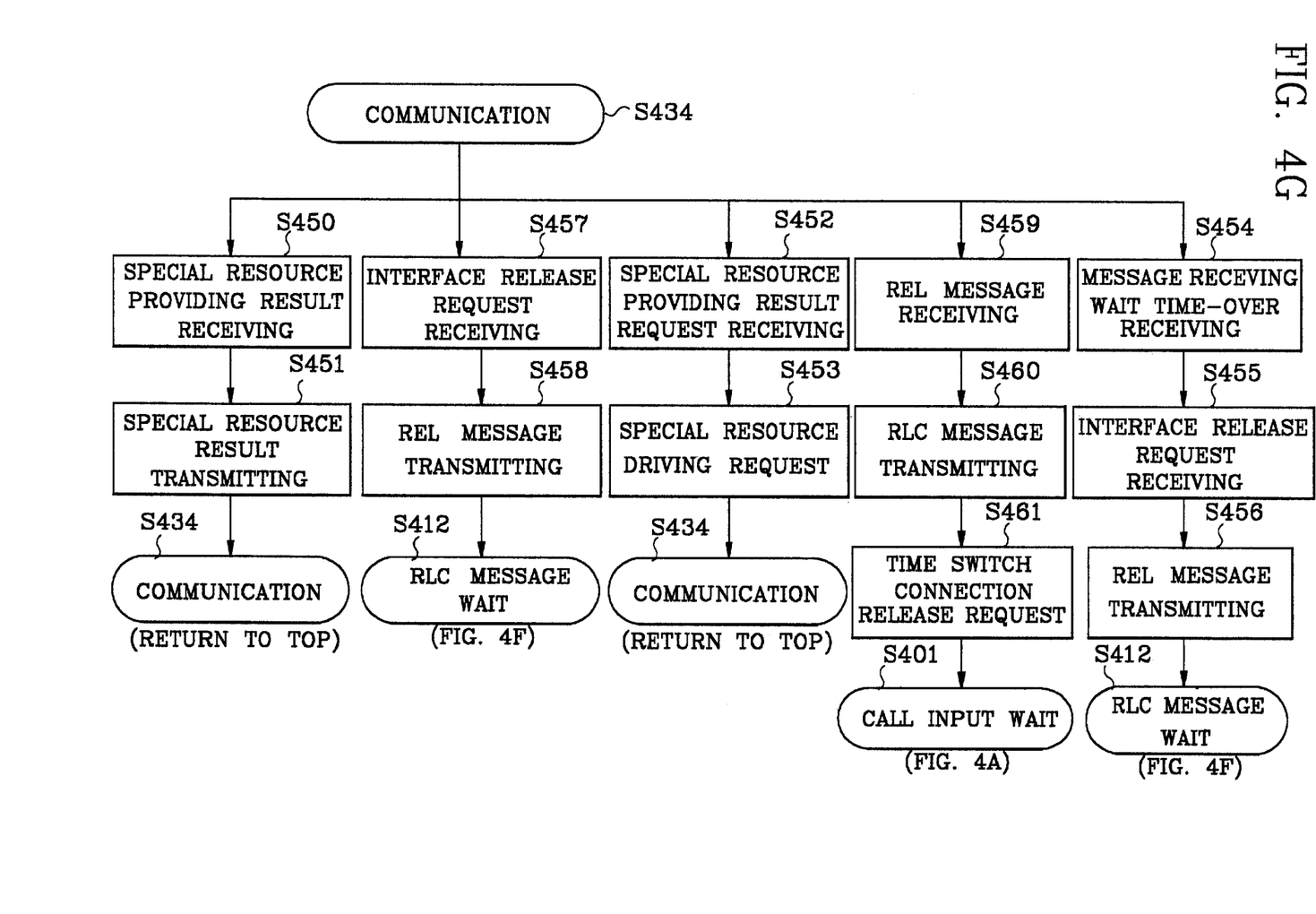

As shown in FIG. 4G, in the state of Step S434, in the case that the special resource providing result message is received from the resource system in Step S450, the special resource providing result is transmitted to the IP-SCP protocol processor 109 in Step S451, and the communication state is maintained in Step S434. In the communication state in Step S434, when the special resource providing request is received from the IP-SCP protocol processor 109 in Step S452, the special resource driving is requested to the resource system in Step S452, and the communication state is maintained in Step S434.

In the communication state S434, if the message is not received from the IP-SCP protocol processor 109 for a predetermine time after the message is transmitted to the SCP in Step S454, the operation is judged to be in an error state, so that the interface release request is transmitted to the IP-SCP protocol processor 109 in Step S455. After the REL message is transmitted to the IP-SSP protocol processor in Step S456, the RLC message from the IP-SSP protocol processor 108 is waited in Step S412.

In the communication state in Step S434, if the call processor 107 receives an IP-SCP interface release request message transferred from the IP-SCP protocol processor 109 in step S457, the REL message is transmitted to the IP-SSP protocol processor 108 in Step S458, and the RLC message from the IP-SSP protocol processor 108 is waited in Step S412.

In addition, in the communication state in Step 434, if the call processor 107 received the REL message transferred from the IP-SSP protocol processor 108, the RLC message is transmitted from the IP-SSP protocol processor 108 in step S460, and the time switch connection release is requested in Step S461, and the routine is shifted to the call input state in Step S401.

As described above, since the resource exchange sub-system includes a common line signal network platform, it is not needed to build another common line signal network platform when expanding the capacity of the system to a larger capacity IP system. Namely, the capacity of the trunk interface is increased by adding a resource sub-system connected with the resource exchange sub-system, and expanding a time switch capacity in the resource exchange sub-system. In addition, since the resource exchange sub-system is built based on the exchange system, the trunk state management and system maintenance functions are more effectively implemented compared to the resource sub-system.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In an IP (Intelligent Peripheral) system providing an IP information to a user through an advanced intelligent network system, said IP system comprising:

means for storing and maintaining a special resource information for providing an intelligent network system to a user in accordance with a request of the user; and means for performing a protocol matching function and a call processing function between a service switching point (SSP) and a service control point (SCP) of the advanced intelligent network system, whereby said both means are separately installed for thereby implementing a direct connection to another intelligent network system through a common line signal network and easily expanding a resource channel.

2. In an IP (Intelligent Peripheral) system providing an IP information to a user through an advanced intelligent network system, said IP system comprising:

a plurality of resource sub-systems storing and managing a special resource information provided to a user who uses the advanced intelligent network system; and a resource exchange sub-system which performs a protocol matching function and a call processing function between a service switching point (SSP) and a service control point (SCP) of the advanced intelligent network system, connects an internal time switch for driving a resource sub-system when being interfaced by a plurality of resource sub-systems and a LAN interface and receiving a message requesting a special resource driving from the SCP and providing to the user, sets a bearer channel with the SSP and sets a special resource channel with the resource sub-system.

3. The system of claim 2, wherein said resource sub-system includes:

a LAN interface forming a TCP/IP link with the resource exchange sub-system and implementing an interface with the LAN interface of the resource exchange sub-system;

a special resource information storing unit for storing a special resource information for providing an intelligent network service to the user; and a trunk interface for matching a special resource channel set in the resource exchange sub-system for providing a user with a special resource information stored in the special resource information storing unit.

4. The system of claim 2, wherein said resource exchange sub-system includes:

a common line signal network platform for interfacing the IP system with a common line signal network;

a first trunk interface for matching a bearer channel set between the SSP and the resource exchange sub-system;

a second trunk interface for matching a special resource channel set between the resource sub-system and the resource exchange sub-system;

a time switch for connecting a bearer channel transferred through the first trunk interface and a special resource channel transferred through the second trunk interface;

a controller means for controlling the first and second trunk interfaces and the time switch;

a LAN interface for interfacing with the resource subsystem for driving the special resource information stored in the resource sub-system in accordance with a special resource request of the intelligent network user;

a protocol processor for processing a protocol between the SSP and the IP system which are the elements of the intelligent network system;

a protocol processors for processing a protocol between the SCP and the IP system which are the elements of the intelligent network system; and a call processor for transmitting and receiving a signal message with the intelligent network system through the protocol processor and instructing an operation of hardware after judging the state of the hardware related with the controller means.

5. The system of claim 2, wherein said network IP providing system is formed by expanding the capacities of the resource exchange sub-system and the trunk interfaces and the time switch of the resource sub-system and additionally connecting the resource sub-system to the resource exchange sub-system.

6. In a network IP (Intelligent Peripheral) providing system formed of a resource sub-system storing and managing a special resource information and a resource exchange sub-system performing a protocol matching function and a call processing function with a service switching point (SSP) and a service control point (SCP) of an advanced intelligent network system, a call processing method for the network IP providing system comprising:

(a) receiving a request message for an intelligent network service from a user and transmitting an initial address message (IAM) to the resource exchange sub-system for a bearer channel connection between the SSP and the IP providing system at the SSP;

(b) checking the capacity of the resource sub-system to provide a user with a special resource at the resource exchange sub-system which received the IAM;

(c) transmitting an address receiving completed message (ACM) to the SSP and then requesting a special resource to the SCP when the resource sub-system is available as a result of the check of step (b);

(d) selecting an available special channel among the special resource channels connected between the resource exchange sub-system and the resource sub-system in accordance with a special resource requested, requesting a connection to the time switch of the resource exchange sub-system for connecting the selected special resource channel and the bearer channel and transmitting an answer message (ANM) to the SSP;

(e) driving the special resource of the resource sub-system connected by the special channel for receiving a special resource from the resource sub-system and transmitting a result of the special resource providing operation to the SCP at the resource exchange sub-system; and (f) maintaining a communication state so that a special resource is transmitted to the user through a special channel set between the resource sub-system and the resource exchange sub-system and a bearer channel set between the resource exchange sub-system and the service exchange.

7. The method of claim 6, wherein said step (b) includes a step for analyzing the IAM received before the resource exchange sub-system checks the capacity of the resource sub-system and testing a continuity by connecting the time switch for a bearer channel loopback when a continuity test is requested.

8. The method of claim 6, wherein in said step (e), the resource exchange sub-system drives a special resource of the resource sub-system and receives a special resource providing result from the resource sub-system using a LAN interface.

9. The method of claim 6, wherein in said step (f), the communication state is stopped when there is not a message transmitted from the SCP to the resource sub-system for a predetermined time after the message is transmitted to the service controller.

10. The method of claim 6, wherein in said step (f), the communication state is stopped when receiving an interface release request message from the service controller.

* * * * *